United States Patent
Limburg et al.

(10) Patent No.: US 11,189,056 B2
(45) Date of Patent: Nov. 30, 2021

(54) METHODS AND DEVICES FOR PERFORMING AN ANALYTICAL MEASUREMENT BASED ON A COLOR FORMATION REACTION

(71) Applicant: Roche Diabetes Care, Inc., Indianapolis, IN (US)

(72) Inventors: Bernd Limburg, Mannheim (DE); Max Berg, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 29 days.

(21) Appl. No.: 16/851,664

(22) Filed: Apr. 17, 2020

(65) Prior Publication Data

US 2020/0242809 A1    Jul. 30, 2020

Related U.S. Application Data

(63) Continuation of application No. PCT/EP2018/078956, filed on Oct. 23, 2018.

(30) Foreign Application Priority Data

Oct. 25, 2017    (EP) ..................................... 17198290

(51) Int. Cl.
     *G06T 7/90*      (2017.01)
     *G06T 7/11*      (2017.01)
     *G06T 11/00*      (2006.01)

(52) U.S. Cl.
     CPC ................. *G06T 7/90* (2017.01); *G06T 7/11* (2017.01); *G06T 11/001* (2013.01); *G06T 2207/10024* (2013.01)

(58) Field of Classification Search
CPC combination set(s) only.
See application file for complete search history.

(56) References Cited

U.S. PATENT DOCUMENTS

| | | | |
|---|---|---|---|
| 2012/0189509 | A1 | 7/2012 | Hsiao |
| 2013/0267032 | A1 | 10/2013 | Tsai et al. |

(Continued)

FOREIGN PATENT DOCUMENTS

| | | |
|---|---|---|
| EP | 1 801 568 A1 | 6/2007 |
| EP | 1 963 828 B1 | 3/2010 |

(Continued)

OTHER PUBLICATIONS

Youngkee Jung,"Smartphone-based colorimetric analysis for detection of saliva alcohol concentration", Nov. 1, 2015, vol. 54, No. 31, Applied Optics,pp. 9183-9188.*

(Continued)

*Primary Examiner* — Omar S Ismail
(74) *Attorney, Agent, or Firm* — Bose McKinney & Evans LLP

(57) ABSTRACT

A method for evaluating the suitability of a mobile device having a camera for performing an analytical measurement based on a color formation reaction. A mobile device is provided and is used to take an image of a reference color field of an object. A color coordinate of pixels of a region of interest within the image is determined and a histogram analysis is performed on a distribution of the color coordinates of the pixels. The width of a color peak within the distribution from the histogram analysis is ascertained and compared with a threshold value to thereby determine suitability of the mobile device for performing the analytical measurement based on the color formation reaction.

9 Claims, 6 Drawing Sheets

(56) References Cited

U.S. PATENT DOCUMENTS

| | | |
|---|---|---|
| 2014/0072189 A1 | 3/2014 | Jena et al. |
| 2014/0154789 A1 | 6/2014 | Polwart et al. |
| 2015/0233898 A1 | 8/2015 | Chen et al. |
| 2015/0308961 A1 | 10/2015 | Burg et al. |
| 2016/0260215 A1 | 9/2016 | Burg et al. |
| 2016/0327473 A1* | 11/2016 | Ozcan ................. G01N 33/1813 |
| 2017/0228892 A1* | 8/2017 | Nichol ....................... G06T 7/90 |

FOREIGN PATENT DOCUMENTS

| | | |
|---|---|---|
| EP | 2 916 117 A1 | 9/2015 |
| WO | WO 2012/131386 A1 | 10/2012 |
| WO | WO 2014/025415 A2 | 2/2014 |

OTHER PUBLICATIONS

Minye Yang,,"A smartphone-based quantitative detection platform of mycotoxins based on multiple-color upconversion nanoparticles," Aug. 2, 2018,Nanoscale,Royal Society of Chemistry,2018,pp. 15865-15870.*

Anil'Incel,"Smart phone assisted detection and quantification of cyanide indrinking water by paper based sensing platform," Jun. 10, 2017,Sensors and Actuators B: Chemical,252 (2017),ScienceDirect,pp. 886-887,890-891.*

International Search Report and Written Opinion of the International Searching Authority, PCT/EP2018/078956, dated Nov. 29, 2018, 11 pages.

International Preliminary Report on Patentability, PCT/EP2018/078956, dated Jan. 30, 2020, 8 pages.

J. Hönes et al., Diabetes Technology and Therapeutics, vol. 10, Supplement 1,2008, pp. 10-26.

* cited by examiner

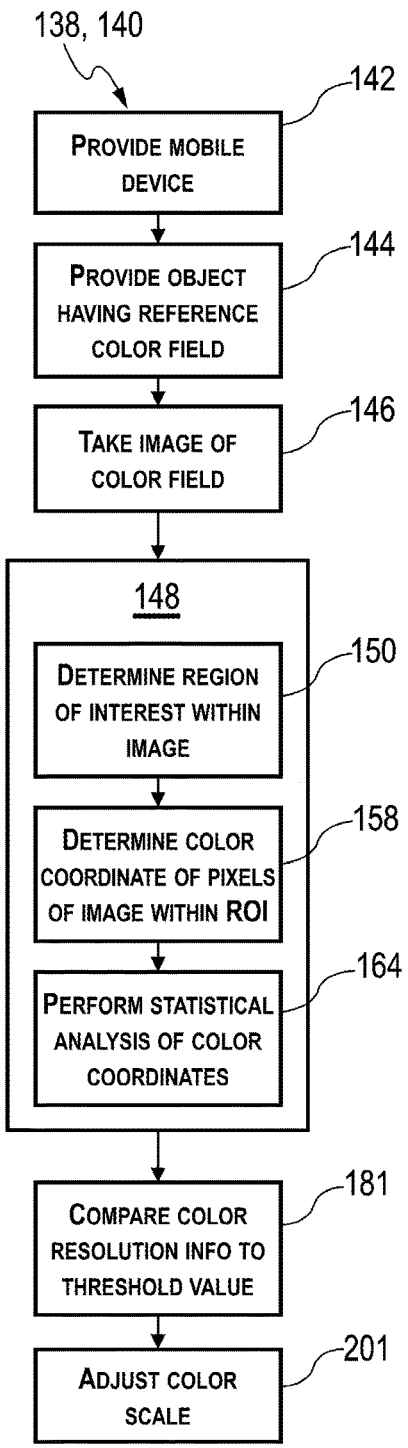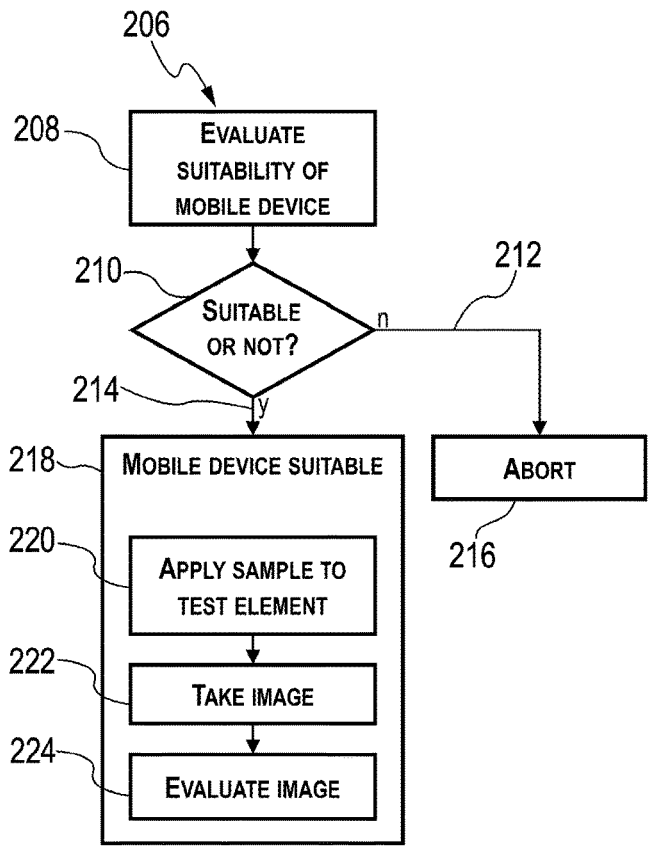
Fig. 2
Fig. 3

METHODS AND DEVICES FOR PERFORMING AN ANALYTICAL MEASUREMENT BASED ON A COLOR FORMATION REACTION

RELATED APPLICATIONS

This application is a continuation of PCT/EP2018/078956, filed Oct. 23, 2018, which claims priority to EP 17 198 290.3, filed Oct. 25, 2017, both of which are hereby incorporated herein by reference.

BACKGROUND

This disclosure generally relates to a method for evaluating the suitability of a mobile device for performing an analytical measurement based on a color formation reaction, the mobile device having at least one camera. This disclosure further relates to a method for performing an analytical measurement based on a color formation reaction, to a computer program and to a mobile device for performing an analytical measurement based on a color formation reaction, as well as to a kit for performing an analytical measurement. Such methods, devices or applications are used in particular for determining blood glucose concentration. In principle, however, alternatively or additionally, determination of one or more other kinds of analytes is also possible, in particular determination of one or more metabolites.

A number of different devices and methods for determining one or more analytes in body fluids, e.g., blood, urine, interstitial fluid and saliva, are known from prior art. Without narrowing the scope, this disclosure specifically will be described with respect to blood glucose measurements. It shall be noted, however, that this disclosure may also be used for other types of analytical measurements using test elements.

Several test elements are known in the art which comprise at least one test chemical, also referred to as a test reagent, which undergo a coloration reaction in the presence of the at least one analyte to be detected. Some basic principles on test elements and reagents that may also be used within the scope of this disclosure are described, e.g., in J. Hones et al.: Diabetes Technology and Therapeutics, Vol. 10, Supplement 1, 2008, pp. 10-26.

In analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers has become more and more popular over recent years.

Thus, WO 2012/131386 A1 discloses a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

Similarly, WO 2014/025415A2 discloses a method and device for performing color-based reaction testing of biological materials. The method includes capturing and interpreting digital images of an unexposed and later exposed instrument within an automatically calibrated environment. The instrument includes a Unique Identification (UID) label, Reference Color Bar (RCB) providing samples of standardized colors for image color calibration, and several testspecific sequences of Chemical Test Pads (CTP). The method further includes locating the instrument in the image, extracting the UID, extracting the RCB, and locating the plurality of CTP in each image. The method further reduces image noise in the CTP and calibrates the image automatically according to lighting measurements performed on the RCB. The method further determines test results by comparing the color of the CTP image to colors in a Manufacturer Interpretation Color Chart (MICC). The method shows these results in graphical or quantified mode.

EP 1801568 A1 discloses a test strip and method for measuring analyte concentration in a biological fluid sample. The method involves positioning a camera at a test strip for pictorially detecting a color indicator and a reference color area. A measured value is determined for the relative position between the camera and the strip and compared with a desired value area. The camera is moved to reduce deflection relative to the strip during the deflection between the measured value and the desired value. An image area assigned to the indicator is localized in a colored image that is detected by the camera. An analyte concentration is determined in a sample by a comparison value.

EP 1963828 B1 discloses a method for measurement of the concentration of at least one analyte which is contained in a sample of a biological fluid, a) wherein a test strip is prepared, which has at least one test point, at least one time indicator and at least one reference color range which comprises the color white and/or a color scale, b) wherein the fluid sample is brought into contact with the test point and the time indicator, c) wherein a color indicator is arranged at the test point as a function of the concentration of the analyte, d) wherein the color of the time indicator is changed as a function of the time duration for which the fluid has been brought into contact with the test point and independently of the concentration of the at least one analyte, e) wherein a camera is positioned on the test strip, f) wherein at least one measured value for the relative position between the camera and the test strip is determined, and is compared with a nominal value range, g) wherein, if there is a discrepancy between the measured value and the nominal value range, the camera is moved relative to the test strip in order to reduce the discrepancy, and steps f) and g) are repeated, h) wherein the camera is used to record a color image on which at least the color indicator, the time indicator and the reference color range are imaged, j) wherein the image areas which are associated with the color indicator, the time indicator and the reference color range are localized in the color image, and the color values of these image areas are determined, k) wherein the time duration between the fluid sample being brought into contact with the test point and the recording of the color image is determined on the basis of the color value determined for the time indicator, with the aid of predetermined reference values, and l) wherein the analyte concentration in the sample is determined on the basis of the color values determined for the color indicator and the reference color range and on the basis of the time duration, with the aid of predetermined comparison values.

Further, U.S. Publication No. 2012/189509 A1 discloses an automatic analyzing method for test strips including steps of: providing a test strip unit at least having a reacting region and an image calibration region; capturing an image of the test strip unit; analyzing the image so as to obtain a first image signal of an image calibration region and a second image signal of a reacting region; comparing the first image signal with a standard signal so as to obtain image signal calibration parameters; calibrating the second image signal by applying the image signal calibration parameters so as to obtain a third image signal; and comparing the third image signal with data in a database so as to obtain corresponding parameter values.

EP 2 916 117 A1 and U.S. Publication No. 2015/308961 A1 describe color quantification of chemical test pads and titration of analytes which may be performed under different lighting conditions. In one embodiment, the lighting condition is estimated under which a digital image is captured and utilized to select a set of reference colors from which the quantified color is compared to determine the titration. In another embodiment, a plurality of comparisons is made with different lighting conditions with the result having the highest confidence level being selected to determine the titration.

In U.S. Publication No. 2014/154789 A1, a testing apparatus for performing an assay is disclosed. The testing apparatus comprises: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

Further, in U.S. Publication No. 2014/072189 A1, a system and method for analysis of colorimetric test strip strips and disease management are described. The system can include an accessory that is operably coupled to a mobile device, the mobile device acquiring and/or analyzing images of the colorimetric test strips. The light box accessory can be detachably attached to the mobile device, or made to remain attached to the mobile device, but with the capability of having the light box accessory removed from the field of view of the camera for general photography purposes. In other embodiments, an image containing known calibration color(s) and reagent area(s) is obtained sans the light box for comparison with a previous calibration image to model changes in ambient lighting conditions and determine a color correction function. The correction can be applied to the detected reagent area color(s) for matching between the detected reagent area color(s) and reference color(s) on the reference chart. Optionally, the information can be processed and displayed to provide feedback, as well as transmitted to a health provider for analysis.

In addition, U.S. Publication No 2013/267032 A1 describes a specimen test strip to detect a characteristic of an analyte in a specimen sample. The specimen test strip includes a reaction area to receive the specimen sample and a color calibration area to determine a color, or a color and a color intensity, of the reaction area after receiving the specimen sample. The specimen test strip may further include a temperature indication area to correct a measurement of the characteristic of analyte.

Further, U.S. Publication No. 2016/260215 A1 describes methods and electronic devices for performing color-based reaction testing of biological materials. The method includes capturing and interpreting digital images of an unexposed and later exposed paddle at various delay times within an automatically calibrated environment. The test paddle includes a unique identification mechanism (UID), a Reference Color Bar (RCB) providing samples of standardized colors for image color calibration, compensation and corrections, and several test-specific sequences of Chemical Test Pads (CTP). The method further includes locating the paddle in the image, extracting the UID and validating the paddle, extracting the RCB and locating the plurality of CTP in each image. The method further reduces image noise in the CTP and calibrates the image automatically according to lighting measurements performed on the RCB. To determine test results, the method further determines several distances between the CTP and its possible trajectory in the color space described by the Manufacturer Interpretation Color Chart.

Despite the advantages involved in using consumer-electronics having a camera for the purpose of evaluating analytical measurements, several technical challenges remain. Thus, even though online calibration method by using test elements having reference color bars are generally known, e.g., from WO 2014/025415A2, the accuracy of the analytical measurement generally depends on a large number of technical factors which, so far, are neglected when evaluating the measurements. Specifically, a huge number of mobile devices having cameras is available on the market, all having different technical and optical properties which have to be considered for the analytical measurement. Some of the mobile devices, even though being capable of capturing images of a test element, may not even be suited for analytical measurements, at all. Further challenges reside in the fact that online calibration measurements are rather complex and time-consuming. Processing time and processing resources, however, specifically are critical, specifically when performing measurements with handheld devices.

SUMMARY

This disclosure provides methods and devices which address the above-mentioned technical challenges of analytical measurements using mobile devices such as consumer-electronics mobile devices, specifically multipurpose mobile devices which are not dedicated to analytical measurements such as smart phones or tablet computers. Specifically, methods and devices are disclosed which are widely applicable to available mobile devices and which are suited to increase measurement accuracy and convenience for the user.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "camera," "color field," and "image," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, a method for evaluating the suitability of a mobile device for the purpose of performing an analytical measurement is disclosed, wherein the mobile device has at least one camera and wherein the analytical measurement is based on a color formation reaction, e.g., by using at least one test chemical as described above. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method steps comprised by the method are as follows:
 a) providing the at least one mobile device having the at least one camera;
 b) providing at least one object having at least one reference color field;
 c) taking at least one image of at least part of the reference color field by using the camera; and
 d) deriving at least one item of color resolution information by using the image.

The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, as will be outlined in further detail below, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, a two-dimensional or even three-dimensional optical information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip. The image itself, thus, may comprise pixels, the pixels of the image correlating to pixels of the camera chip.

The camera, besides the at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually. The camera, specifically, may be integrated into the mobile device.

The term "suitability" as used herein is a broad term and is to be given its ordinary and customary meaning to a person of ordinary skill in the art and is not to be limited to a special or customized meaning. The term specifically may refer, without limitation, to a property of an element or device for performing one or more predetermined functions. Thus, as an example, the suitability may be qualified or quantified by using one or more characteristic parameters of the device. These one or more characteristic parameters, as will be outlined in further detail below, may, individually or according to a predetermined combination, be compared with one or more conditions. As a simple example, the individual parameters or one or more of the parameters may be compared with one or more comparative values, reference values or standard values, wherein the comparison may be a qualitative or a quantitative comparison and may result in a binary result such as "suited" or "not suited"/"unsuited." As an example, the at least one comparative or reference value may comprise at least one threshold value as will be outlined in further detail below. Additionally or alternatively, however, the comparison may result in a quantitative result, such as a figure indicating a degree of suitability. The comparative values, reference values or standard values may be derived, as an example, from experiments or from boundary conditions determined, e.g., by the precision to be achieved.

The term "analytical measurement" as used herein is a broad term and is to be given its ordinary and customary meaning to a person of ordinary skill in the art and is not to be limited to a special or customized meaning. The term specifically may refer, without limitation, to a qualitative and/or quantitative determination of at least one analyte in a sample. The result of the analytical measurement, as an example, may be a concentration of the analyte and/or the presence or absence of the analyte to be determined.

The at least one analyte, as an example, may be or may comprise one or more specific chemical compounds and/or other parameters. As an example, one or more analytes may be determined which take part in metabolism, such as blood glucose. Additionally or alternatively, other types of analytes or parameters may be determined, e.g., a pH value. The at least one sample, specifically, may be or may comprise at least one bodily fluid, such as blood, interstitial fluid, urine, saliva or the like. Additionally or alternatively, however, other types of samples may be used, such as water.

The term "color formation reaction" as used herein is a broad term and is to be given its ordinary and customary meaning to a person of ordinary skill in the art and is not to be limited to a special or customized meaning. The term specifically may refer, without limitation, to a chemical, biological or physical reaction during which a color, specifically a reflectance, of at least one element involved in the reaction, changes with the progress of the reaction. Thus, as an example, reference may be made to the above-mentioned biochemical reactions which typically are used for detecting blood glucose, involving a color change. Other types of color changing or color formation reactions are known to the skilled person, such as typical chemical reactions for determining the pH value.

The at least one object, as will be outlined in further detail below, may be an arbitrary object having the at least one reference color field integrated therein, disposed thereon or attached thereto. Thus, as an example, the at least one reference color field may be printed onto at least one visible surface of the object.

The term "reference color field" as used herein is a broad term and is to be given its ordinary and customary meaning to a person of ordinary skill in the art and is not to be limited to a special or customized meaning. The term specifically may refer, without limitation, to an arbitrary two-dimensional area which has a predetermined color of known properties. Thus, as an example, one, more than one or all of the color coordinates according to at least one standard coordinate system of the at least one reference color field may be known. As an example, the at least one reference color field may have the shape of a rectangle, a circle, an oval or a polygon of homogeneous color. The object may comprise one reference color field or a plurality of reference color fields, such as a plurality of reference color fields having different colors.

The taking of the at least one image of at least part of the reference color field by using the camera specifically may imply taking an image which at least comprises a region of interest within the at least one reference color field. Thus, as an example, the reference color field may be detected automatically within the image, e.g., by pattern recognition techniques generally known to the skilled person, and at least one region of interest may be chosen within the reference color field, e.g., a rectangular, square, polygonal, oval or round region of interest. The taking of the at least one image may be initiated by the user action or may automatically be initiated once the presence of the at least one reference color field within a field of view and/or within a predetermined sector of the field of view of the camera is automatically detected. These automatic image acquisition techniques are known, e.g., in the field of automatic barcode readers, such as from automatic barcode reading apps.

The term "color resolution information" as used herein is a broad term and is to be given its ordinary and customary meaning to a person of ordinary skill in the art and is not to be limited to a special or customized meaning. The term specifically may refer, without limitation, to an arbitrary item of information, e.g., one or more numerical values, which quantify the capability of resolving two or more colors. Therein, the term "resolving" generally refers to the question whether colors are determined to be different or identical. In terms of spectral properties, as an example, the color resolution may refer to the question whether the individual spectra of each color are distinguishable or not. As an example, in case of a pure color such as red, green or blue, the spectrum of a color may have the shape of a peak. The width of the peak firstly may be determined by the spectral properties of the light source and/or of the object reflecting the light and, secondly and additionally, may be determined by the spectral properties of a detector detecting the light, such as the pixels of the camera. In case a plurality of pixels is involved, as is generally the case when taking an image with a camera, the spectral properties and the distribution of spectral properties of the plurality of pixels has to be considered which, generally, create statistical effects such as a distribution. Thus, in order to distinguish two peaks of two different colors, the peaks have to be separated by at least a minimum spectral distance, which, generally, has to be greater than the width of the single peaks. Thus, as an example, the at least one item of color resolution information may comprise a minimum distance of two color signals or color peaks in a spectrum or in at least one color coordinate which is required for distinguishing the two color signals or color peaks.

As will be outlined in further detail below, various ways of determining color resolution information are generally known and may be used in the present method. As an example, statistical information regarding the distribution of at least one parameter, such as of at least one color coordinate, may be collected over a group of pixels, such as all of the pixels or at least a plurality of pixels over a region of interest, and statistical information, such as a width of the distribution or of at least one peak of the distribution, may be determined. Exemplary embodiments will be given in further detail below.

The method according to the first aspect may further be refined by comprising the following step:

e) comparing the at least one item of color resolution information with at least one threshold value, thereby determining at least one item of suitability information on the suitability of a mobile device for the purpose of performing the analytical measurement based on the color formation reaction.

Thus, at least one threshold value for the item of color resolution may be given, such as a predetermined or determinable threshold value. As outlined above, as an example, the at least one threshold value may be determined or predefined by a desired precision of the analytical measurement. Thus, as an example and as will be outlined by exemplary embodiments in further detail below, for glucose measurements, a certain maximum tolerance may be given, such as a maximum deviation of 2% at 100 mg/dl blood glucose concentration. By using at least one predetermined or determinable relationship between a color coordinate and the glucose concentration, which, as an example, may be determined analytically or empirically, the maximum tolerance or maximum deviation may be transformed into a minimum resolution of color. Thus, as discussed above, the minimum resolution may indicate how far color peaks have to be separated in terms of a respective color coordinate in order to be distinguishable. Since, as discussed above, the possibility of distinguishing these color peaks depends on the width of the peaks as a statistical parameter over the pixels of the image, the maximum tolerance may thereby be transformed into a maximum width over the pixels taken into account for detecting the color formation reaction. Consequently, in step e), as an example, the width of the distribution or of a peak of the distribution as derived in step d), e.g., of a peak in the distribution of counts for a certain color coordinate, may be compared with a threshold value derived from the desired accuracy of the glucose concentration determination. It shall be noted, however, that other possibilities for comparing the at least one item of color resolution information with the at least one threshold value are feasible. Thus, as an example, comparisons of the type $A<T$; $A>T$; $A \leq T$; $A \geq T$; $T1<A<T2$; $T1 \leq A<T2$; $T1<A \leq T2$ or $T1 \leq A \leq T2$ are feasible, with T, T1, T2 being threshold values and A being the at least one item of color resolution information.

The term "item of suitability information" as used herein is a broad term and is to be given its ordinary and customary meaning to a person of ordinary skill in the art and is not to be limited to a special or customized meaning. The term specifically may refer, without limitation, to an indication or information regarding the suitability, specifically in the present case of the suitability of the mobile device for the purpose of performing the analytical measurement based on the color formation reaction. The item of suitability information, as an example, may be Boolean or digital information, such as indicating "suited" or "not suited"/"unsuited." Thus, as an example, in case the width of the distribution of a peak of a statistical distribution of a color coordinate may be compared with at least one threshold value, e.g., a threshold value derived by using a maximum tolerance of a glucose measurement, and, in case the width is larger than the threshold value or a larger or at least equal to the threshold value, the mobile device may be determined as being unsuited for the purpose of performing the analytical measurement based on the color formation reaction. Alternatively, however, as already outlined above, the suitability may also be quantified.

Besides using the at least one item of color resolution information for determining the suitability information, the at least one item of color resolution information may, additionally or alternatively, also be used for other purposes. Thus, as an example, once the mobile device is determined as being suited for the purpose of the analytical measurement, an adjustment or calibration of the mobile device may take place by using the at least one color resolution information. Generally, as an example, the method may comprise the following step:

f) adjusting at least one color scale of the mobile device for the analytical measurement.

Thus, as an example, in case a peak is detected in a statistical distribution of intensities over a color coordinate, the peaks corresponding to a certain reference color of the reference color field, the color indicated by the center of the peak is generally known, and a calibration of the color coordinate may take place, thereby, e.g., adjusting the color scale of the mobile device for the analytical measurement.

Further optional details may relate to the deriving of the at least one item of color resolution information in step d). Thus, as an example, the step of deriving the at least one color resolution information by using the image may comprise the following substeps:

d1) determining at least one region of interest within the image;
d2) determining at least one color coordinate of pixels of the image within the region of interest;
d3) performing at least one statistical analysis on a distribution of the color coordinates of the pixels and deriving the at least one item of color resolution information by using at least one result of the statistical analysis.

Potential embodiments of these substeps were already discussed in part above.

The term "region of interest" (ROI) as used herein is a broad term and is to be given its ordinary and customary meaning to a person of ordinary skill in the art and is not to be limited to a special or customized meaning. The term specifically may refer, without limitation, to a subset of data within a larger data set, the subset being identified for a particular purpose. As an example, the term may refer to at least one partial image or region within an image, determined for a certain purpose. In the present context, the region of interest specifically may be a partial image which is used in step d) for deriving the at least one item of color resolution information. For determining the region of interest, as an example, the reference color field may be detected, e.g., by image recognition techniques generally known to the skilled person, such as by recognizing the shape or order lines of the reference color field. As an example, a circular, rectangular, square, oval or polygonal region of interest may be inserted into the part of the image recognized as an image of the reference color field, and step d) may be performed within this region of interest. The region of interest, specifically, may be detected automatically. The determination of the region of interest may also be repeated in case no region of interest can be determined or in case the image quality is detected to be too low for determining the region of interest. Further exemplary embodiments will be given below.

The term "color coordinate" as used herein is a broad term and is to be given its ordinary and customary meaning to a person of ordinary skill in the art and is not to be limited to a special or customized meaning. The term specifically may refer, without limitation, to the coordinate of an arbitrary color coordinate system used for describing a color using coordinates. Several color coordinate systems are generally known to the skilled person and may also be used in the context of this disclosure. Thus, as an example, a colorimetric coordinate system or a coordinate system may be used which is based on the human perception, such as the CIE 1964 color space, the Munsell color system or other coordinate systems, such as R, G, B, L, a, b. Specifically, in the development of color coordinate systems based on the human perception, the anatomy of the human eye may have been taken into account, whereas other coordinate systems may be based on physically pure color perception, such as for example wavelengths. Again, as mentioned above, in the context of this disclosure, several color coordinate systems, for example, color coordinate systems based on the human perception and/or color coordinate systems based on wavelengths, may be used, such as colorimetric color coordinates and/or radiometric color coordinates.

Therein, one, more than one or even all of the color coordinates of several or even all of the pixels of the region of interest may be determined. In the most simple case, as an example, a color coordinate may be used which is known to undergo a most significant or profound change during the color formation reaction. As an example, in case a specific test chemical is known to change its hue most profoundly in the blue spectral range during the color formation reaction used for detecting an analyte, a blue color coordinate may be used, and the blue color coordinate may be determined for all of the pixels or for at least a group of the pixels of the region of interest within the image, and a statistical analysis of the distribution of intensities over the blue color coordinates may be performed. Alternatively, however, another color coordinates may be used. Again, alternatively, a combination of color coordinates may be used. Thus, as an example, a linear combination or another combination of a plurality of color coordinates may be used, such as by using a combined coordinate containing 80% of a blue color coordinate, 15% of a red color coordinate and 5% of a green color coordinate. The statistical analysis, in this case, may be performed over this combined color coordinate. Other embodiments are feasible.

As will be outlined in further detail below, the statistical analysis of the distribution over the at least one color coordinate over the pixels of the region of interest within the image of the reference color field specifically may contain a histogram analysis, e.g., a histogram analysis of a distribution of color coordinates. By using the statistical analysis, as an example, as discussed above and as will be outlined in further detail below, at least one width of at least one statistical distribution of intensities over the at least one color coordinate may be determined, in order to derive a color resolution information. Additionally or alternatively, as will also be outlined in further detail below, by using several reference color fields having different colors, several peaks may be analyzed.

The statistical analysis, as outlined above, specifically may comprise determining at least one width of at least one color peak within the distribution of color coordinates, specifically a half width, more specifically a full width at half maximum. Thus, as an example, a histogram over the color coordinates may be established, e.g., by quantization of the color coordinates into distinct sections on the axis of the at least one color coordinate, and, subsequently, a curve may be fitted to the histogram, e.g., a Gaussian bell-curve and/or a Poisson curve, and the widths, such as the full width at half maximum (FWHM) may be derived as a fitting parameter. As outlined above, the width directly may indicate the color resolution of the camera and/or of the mobile device.

As also discussed above, since the width is an indication of the color resolution capability of the mobile device and/or of the camera, the widths may directly be compared with at least one threshold value. Thus, as an example, the method may comprise comparing the width with at least one threshold value for determining the suitability of a mobile device for the purpose of performing the analytical measurement based on the color formation reaction. As also discussed above, the threshold, also referred to as a threshold value, specifically may be determined by providing a desired maximum inaccuracy of the analytical measurement, transforming the desired maximum inaccuracy into a minimum resolution by using a known relationship between at least one analyte to be determined in the analytical measurement and the at least one color coordinate, and determining the threshold value by using the minimum resolution.

The statistical analysis may also comprise, additionally or alternatively, deriving one or more other items of information. Thus, as an example, the statistical analysis may comprise determining at least one color coordinate of at least one center of at least one color peak within the distribution of color coordinates. Thus, as an example, the center may directly be derived by detecting a maximum in a histogram or, alternatively, by using one or more fitting algorithms, such as fitting one or more of the above-mentioned fitting curves, and by determining the maximum of the fitting curve as a fitting parameter. As outlined above, the detection of the color peak and, specifically, the detection of the center of the color peak, may be used for, e.g., calibrating the mobile device, since the color corresponding to the color peak is generally known from the properties of the reference color field.

As outlined above, the at least one reference color field may comprise one reference color fields having a homogeneous color or, alternatively, a plurality of reference color fields, each having a homogeneous color, or, again alternatively, having a distribution of different colors. Thus, as an example, the object may have at least two reference color fields having different colors, wherein the statistical analysis may comprise determining at least two color peaks corresponding to the at least two different colors. Thus, as discussed above, maxima in the histogram may be determined for determining the centers of the peaks or fitting curves may be fitted to the histogram, such as fitting curves having a plural bell-shaped peaks or the like, and the detection of the color peaks may be a result of the fitting. Additionally or alternatively, the width of the different color peaks may be determined separately. Again, additionally or alternatively, separate color coordinates may be used for evaluating the separate reference color fields.

Specifically, in case a plurality of colors is used in the at least one reference color field, the statistical analysis may comprise determining a distance between the centers of the at least two color peaks. The at least one item of color resolution information, in this case, specifically may comprise the distance between the at least two color peaks. Again and as discussed above, the distance specifically may be derived as a fitting parameter. The method specifically may comprise comparing the distance between the centers of the at least two color peaks with at least one threshold value for determining the suitability of a mobile device for the purpose of performing the analytical measurement based on the color formation reaction. The at least one threshold value may also comprise an interval, in order to check if the determined distance lies within a tolerance interval, e.g., in order to check whether the mobile device is suited for rendering color distances or color differences correctly.

The method specifically may comprise determining at least one calibration factor for color rescaling based on a ratio of the distance between the centers of the at least two color peaks and an expected distance between the centers of the at least two color peaks. Thus, as an example, in case the reference color field comprises different hues of blue which are generally known to have a predetermined separation in the blue-color coordinate, the experimentally determined difference between the centers of the at least two color peaks may be compared with the expected or predetermined separation, and the color scale, as an example, may be stretched by a factor representing a quotient between the determined distance and the expected separation are distance or its inverse value. Other types of color rescaling are feasible. Thus, as an example, an offset correction may be performed, e.g., in order to shift a specific center of a color peak into a predetermined location.

As will be outlined in further detail below, the method for evaluating the suitability of a mobile device as well as the below mentioned method for performing an analytical measurement specifically may fully or partially be computer implemented, specifically on a computer of the mobile device, such as a processor of the mobile device. Thus, specifically, the methods may be implemented as so-called apps, e.g., for Android or iOS, and may, as an example, be downloadable from an app store. Thus, specifically, in the method for evaluating the suitability of a mobile device, the method may comprise using at least one processor and software instructions for performing at least method step d). The software instructions, specifically the app, further may provide user instructions, e.g., by one or more of a display, by audio instructions or other instructions, in order to support method steps a), b) and c). Therein, as indicated above, method step c) may also fully or partially be computer implemented, e.g., by automatically taking the at least one image of the at least one part of the reference color field by using the camera once the reference color field is within a field of view of the camera and/or within a certain range within the field of view. The processor for performing the method specifically may be part of the mobile device.

As outlined above, the mobile device specifically may be a mobile computer and/or a mobile communications device. Thus, specifically, the mobile device may be selected from the group consisting of: a mobile communications device, specifically a smart phone; a portable computer, specifically a notebook; a tablet computer.

As indicated above, further method steps may be computer implemented or computer assisted, specifically by a processor of the mobile device. Thus, as an example, method step c) may comprise providing visual guidance for a user for positioning the mobile device relative to the object. Additionally or alternatively, audio guidance or other type of guidance may be given.

In a further aspect of this disclosure, a method for performing an analytical measurement based on a color formation reaction is disclosed, wherein the method uses a mobile device having at least one camera. The method comprises the following method steps, which may be performed in the given order. Again, however, a different order may also be possible. Further, one, more than one or even all of the method steps may be performed once or repeatedly. Further, the method steps may be performed successively or, alternatively, two or more method steps may be performed in a timely overlapping fashion or even in parallel. The method may further comprise additional method steps which are not listed.

The method comprises the following steps:
i) evaluating the suitability of the mobile device by using the method for evaluating the suitability of a mobile device as proposed herein and as described e.g., in one or more of the embodiments disclosed above or disclosed in further detail below;
ii) if the at least one item of color resolution information indicates the mobile device being unsuited for performing the analytical measurement, aborting the method for performing the analytical measurement;
iii) if the at least one item of color resolution information indicates the mobile device being suited for performing the analytical measurement, performing the analytical measurement, comprising the following steps:
   a. applying at least one sample to at least one test element having at least one test chemical capable of a color formation reaction;
   b. taking at least one image of at least part of the test element by using the camera;
   c. evaluating the image and deriving at least one analytical information thereof.

For further possible definitions of most of the terms used herein, reference may be made to the disclosure of the method for evaluating the suitability of the mobile device as disclosed above or as disclosed in further detail below.

With respect to method step i), reference may be made to the description of the methods above. Thus, as an example, reference may be made to the description of method step e), wherein the at least one item of color resolution information may be compared with at least one threshold value, thereby determining at least one item of suitability information on the suitability of a mobile device for the purpose of performing the analytical measurement based on the color formation reaction. Method step i), as an example, may make use of the at least one item of suitability information which, as an example, may be or may comprise digital information or Boolean information "suited" or "not suited." Depending on this suitability information, the method may branch in between steps ii) and iii), wherein the inquiry regarding the suitability in step i) may be programmed, e.g., as an "if . . . " routine, an "if . . . else . . . " routine or the like.

For evaluating the at least one image and deriving the at least one analytical information thereof, several algorithms may be used which generally are known to the skilled person in the field of analytics, such as in the field of blood glucose monitoring. Thus, as an example, a predetermined or determinable relationship between the at least one color coordinate of the test element, such as the test field, may be monitored. Again, statistical analysis may be performed over the test element or a part thereof, such as over a test field containing the at least one test chemical and/or over a region of interest within the test field containing the at least one test chemical. Thus, as an example, the at least one test field within the image of the test element may be recognized, preferably automatically, e.g., by pattern recognition and/or other algorithms as described in examples below. Again, one or more regions of interest may be defined within the partial image of the test field. Over the region of interest, color coordinates, e.g., again blue color coordinates and/or other color coordinates, may be determined, e.g., again by using one or more histograms. The statistical analysis may comprise sitting one or more fitting curves, such as described above, to the at least one histogram, thereby e.g., determining a center of a peak. Thus, the color formation reaction may be monitored by using one or more images, wherein, for the one or more images, by using statistical analysis, the center of the peak may be determined, thereby determining a color shift within the at least one coordinate. Once the color formation reaction is finished or has reached a predetermined or determinable endpoint, as the skilled person generally knows, e.g., from blood glucose monitoring, the shift in the at least one color coordinate or an endpoint color coordinates may be determined and may be transformed into, e.g., a concentration of the analyte in the sample by using a predetermined or determinable correlation between the color coordinate and the concentration. The correlation, as an example a transformation function, a transformation table or a lookup table, may be determined, e.g., empirically and may, as an example, be stored in at least one data storage device of the mobile device, e.g., by the software, specifically by the app downloaded from an app store or the like.

As discussed above, in the methods known in the art, calibration information is typically provided by the test strip or test element itself. The method as proposed herein, however, may separate the step of evaluating the suitability of the mobile device and the actual step of performing the analytical measurement, wherein, once the suitability is determined, an arbitrary number of analytical measurements may be performed using the mobile device. Alternatively, however, the evaluation of the suitability of the mobile device in step i) may be repeated, e.g., after predetermined or determinable intervals or in case any changes are made to the mobile device. The software, e.g., the software app, may prompt the user to perform method step i), e.g., by providing corresponding instructions on a display and/or as audio instructions. Specifically, however, method step i) may be performed at least once before method step iii) is performed, if at all. Method step i) may be performed once before method step iii) is performed at least once, or method step i) may be performed once before method step iii) is performed repeatedly.

In case the at least one item of color resolution information indicates the mobile device being unsuited for performing the analytical measurement, the method for performing the analytical measurement is aborted. This abortion, as an example, may also comprise informing a user of the mobile device of the unsuitability of the mobile device for performing the analytical measurement. The information, as an example, may be provided as the usual information on a display and/or as audible information.

Additionally or alternatively, in case the mobile device is determined as being unsuited for performing the analytical measurement, step ii) may also comprise blocking future attempts to perform the analytical measurement by using the mobile device. Thus, as an example, in case a user retries to start the software app on his or her mobile phone, a message such as "Sorry, mobile device not suited!" or the like may be displayed on a display, and the analytical measurement may be prevented.

In a further aspect, a computer program including computer-executable instructions for performing the method according to any one of the embodiments as described herein is disclosed, specifically method step d) and optionally one or more of the method steps c), e) and f), when the program is executed on a computer or computer network, specifically a processor of a mobile device having at least one camera. Further, the computer-executable instructions may also be suited for performing method steps i) and ii) and, optionally, to provide at least guidance for method step iii). Therein, use or guidance for partial step a) may be provided, the taking of the at least one image in partial step b) may be initiated automatically by the computer-executable instructions, and the evaluation of the image and the deriving of the analytical information in step c) may be performed by computer-executable instructions.

Thus, generally speaking, disclosed and proposed herein is a computer program including computer-executable instructions for performing the method according to this disclosure in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, preferably by using a computer program. The computer specifically may be fully or partially integrated into the mobile device, and the computer programs specifically may be embodied as a software app. Alternatively, however, at least part of the computer may also be located outside the mobile device.

Further disclosed and proposed herein is a computer program product having program code in order to perform the method in one or more of the embodiments disclosed herein when the program is executed on a computer or computer network, e.g., one or more of the method steps mentioned above. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein, specifically one or more of the method steps mentioned above.

Further disclosed and proposed herein is a computer program product with program code means stored on a machine-readable carrier, in order to perform the method according to one or more of the embodiments disclosed herein, when the program is executed on a computer or computer network, specifically one or more of the method steps mentioned above. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein, specifically one or more of the method steps mentioned above.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further aspect of this disclosure, a mobile device for performing an analytical measurement based on a color formation reaction is disclosed. The mobile device comprises at least one camera. The mobile device is configured for performing a self-suitability evaluation by using the following steps:

I. taking at least one image of at least part of at least one reference color field on at least one object by using the camera; and II. deriving at least one item of color resolution information by using the image.

For most of the terms used herein and possible definitions, reference may be made to the description of the methods above. The term "self-suitability evaluation" as used herein is a broad term and is to be given its ordinary and customary meaning to a person of ordinary skill in the art and is not to be limited to a special or customized meaning. The term specifically may refer, without limitation, to a process of a device for evaluating whether the device itself is suited or not suited for a predetermined purpose, wherein, with respect to the suitability, reference may be made to the description given above.

The mobile device specifically may be configured for performing at least one analytical measurement based on a color formation reaction, specifically after performing the self-suitability evaluation, by using the following steps:

III. evaluating the suitability of the mobile device based on the at least one item of color resolution information;

IV. if the at least one item of color resolution information indicates the mobile device being unsuited for performing the analytical measurement, aborting the analytical measurement;

V. if the at least one item of color resolution information indicates the mobile device being suited for performing the analytical measurement, performing the analytical measurement, comprising the following steps:
   a. taking at least one image of at least part of a test element by using the camera, the test element having at least one test chemical capable of a color formation reaction, specifically at least one test field, the test element having applied thereto at least one sample;
   b. taking at least one image of at least part of the test element by using the camera;
   c. evaluating the image and deriving at least one analytical information thereof.

For possible definitions or embodiments, reference may be made to the description of the method as given above. Thus, specifically, the mobile device may be configured for performing the method for evaluating the suitability of a mobile device and/or the method for performing an analytical measurement based on a color formation reaction according to any one of the embodiments described above or described in further detail below. Specifically, the mobile device may comprise at least one computer, such as at least one processor, which is programmed to perform the method or, specifically, the method steps indicated above.

In a further aspect of this disclosure, a kit for performing an analytical measurement is disclosed. The kit comprises:
at least one mobile device according to any one of the embodiments described above or described in further detail below;
at least one object having at least one reference color field; and
at least one test element having at least one test chemical capable of a color formation reaction.

Again, for possible definitions of terms and possible embodiments, reference may be made to the description given above.

Therein, for the choice of the object, several possibilities exist. Thus, as a first example, the at least one reference color field, as an example, may directly be implemented into or, e.g., printed onto or attached to a test element, such as a test strip. Alternatively, however, since the suitability check of the mobile device may be performed once for a plurality of analytical measurements, the reference color field may also be applied to a different type of object, such as a container for receiving the at least one test element, a color shim or the like. Thus, as an example, the object may be selected from the group consisting of: a container for receiving the at least one test element; a reference color shim; the test element, with the test element having the at least one reference color field applied thereon. Other possibilities may exist.

The methods and devices according to this disclosure may provide a large number of advantages over known methods and devices for analytical measurements. Thus, specifically, a process of performing an analytical measurement based on a color formation reaction as taught herein may be less time-consuming, compared to other processes known by prior art. In particular, it is possible to evaluate a general aptitude of the mobile device by performing one single measurement in accordance with this disclosure. An established aptitude of the mobile device by one single measurement may be valid for all subsequent measurements. Thus, the method according to this disclosure may need less time for performing an analytical measurement compared to prior art approaches focusing on applying correction algorithms prior to each analyte measurement. Specifically, in accordance with this disclosure, the aptitude of the mobile device may be established by one single measurement for essentially all subsequent measurements as opposed to applying correction algorithms prior to each measurement. Thus, with this disclosure it may be possible to perform at least one of the subsequent analytical measurements faster than state-of-the-art approaches. Thereby, the process of performing the analytical measurement based on a color formation reaction may be simplified for a user. Specifically, once a general aptitude of the mobile device is established, in at least one, preferably all, subsequent measurements the process of performing the analytical measurement may be simpler than state-of-the-art measurements. In particular, using a suitable mobile device, this disclosure may simplify the process of performing a blood glucose measurement based on a color formation reaction for a user. When using a suitable mobile device, the process of performing the blood glucose measurement based on a color formation reaction may, particularly, need less time than state-of-the-art processes.

Further, this disclosure may allow a detection of degradation within the mobile device, such as defects occurring over time, for example aging signs, and/or defects arising from stress or damage, e.g., scratches and/or dents within the camera lens. The degradation effects may be detected by way of repeatedly evaluating the suitability of the mobile device. Thus, repeating the evaluation of the suitability at predefined intervals, may allow detecting degradation effects.

This disclosure may further provide advantages in terms of the environment compared to state-of-the-art methods and devices for analytical measurements. In particular, this disclosure may reduce a usage of separate disposable devices and/or housings often employed in prior art systems in order to ensure defined lighting conditions. The use of disposable devices and/or housings employed to ensure defined lighting conditions may not be necessary. Thus, for example, these teachings may allow avoiding such disposable devices or housings.

According to one embodiment, the method taught herein may only allow a use of an application, e.g., an app, including computer-executable instructions for performing an analytical measurement based on a color formation reaction, in conjunction with a mobile device suitable for performing the analytical measurement based on the color formation reaction. Particularly, this disclosure may only allow the use of the application in conjunction with a mobile device suitable for generating accurate and precise results when performing the analytical measurement based on the color formation reaction. Thereby, this disclosure may improve a safety of using a mobile device for performing the analytical measurement, particularly the blood glucose measurement, based on the color formation reaction. Specifically, the method taught herein may allow identifying the suitability of the mobile device before admitting a use of the mobile device for performing the blood glucose measurement based on a color formation reaction. More specifically, a use of the application including computer-executable instructions for performing such an analytical measurement in conjunction with the mobile device, may only be admitted using the mobile device suitable for the analytical measurement based on the color formation. Particularly, the method taught herein may only admit a usage of the application after the suitability of the mobile device is ensured. For example, a download of the application on the mobile device unsuited or unfit for performing the blood glucose measurement based on the color formation reaction may be inhibited. The download of the application on the mobile device may be restricted until the aptitude of the mobile device may be ensured. Thus, this disclosure may improve the safety of blood glucose measurement with the mobile device by evaluating the suitability of the mobile device, e.g., in an initial validation step or check, prior to admitting the performing of the blood glucose measurement by the mobile device.

Summarizing and without excluding further possible embodiments, the following embodiments may be envisaged:

EMBODIMENT 1

A method for evaluating the suitability of a mobile device having at least one camera for performing an analytical measurement based on a color formation reaction, comprising:
- a) providing the at least one mobile device having the at least one camera;
- b) providing at least one object having at least one reference color field;
- c) taking at least one image of at least part of the reference color field by using the camera; and
- d) deriving at least one item of color resolution information by using the image.

EMBODIMENT 2

The method according to the preceding embodiment, further comprising:
- e) comparing the at least one item of color resolution information with at least one threshold value, thereby determining at least one item of suitability information on the suitability of a mobile device for the purpose of performing the analytical measurement based on the color formation reaction.

EMBODIMENT 3

The method according to any one of the preceding embodiments, further comprising:
- f) adjusting at least one color scale of the mobile device for the analytical measurement.

EMBODIMENT 4

The method according to any one of the preceding embodiments, wherein the step of deriving the at least one color resolution information by using the image comprises:
- d1) determining at least one region of interest within the image;
- d2) determining at least one color coordinate of pixels of the image within the region of interest;
- d3) performing at least one statistical analysis on a distribution of the color coordinates of the pixels and deriving the at least one item of color resolution information by using at least one result of the statistical analysis.

EMBODIMENT 5

The method according to the preceding embodiment, wherein the statistical analysis comprises a histogram analysis of a distribution of color coordinates.

EMBODIMENT 6

The method according to any one of the two preceding embodiments, wherein the statistical analysis comprises determining at least one width of at least one color peak within the distribution of color coordinates, specifically a half width, more specifically a full width at half maximum.

EMBODIMENT 7

The method according to the preceding embodiment, wherein at least one item of color resolution information comprises the width.

EMBODIMENT 8

The method according to any one of the two preceding embodiments, wherein the method comprises comparing the width with at least one threshold value for determining the suitability of a mobile device for the purpose of performing the analytical measurement based on the color formation reaction.

EMBODIMENT 9

The method according to the preceding embodiment, wherein the threshold value is determined by providing a desired maximum inaccuracy of the analytical measurement, transforming the desired maximum inaccuracy into a minimum resolution by using a known relationship between at least one analyte to be determined in the analytical measurement and the at least one color coordinate, and determining the threshold value by using the minimum resolution.

EMBODIMENT 10

The method according to any one of the six preceding embodiments, wherein the statistical analysis comprises determining at least one color coordinate of at least one center of at least one color peak within the distribution of color coordinates.

EMBODIMENT 11

The method according to any one of the seven preceding embodiments, wherein the object has at least two reference color fields having different colors, wherein the statistical analysis comprises determining at least two color peaks corresponding to the at least two different colors.

EMBODIMENT 12

The method according to the preceding embodiment, wherein the statistical analysis comprises determining a distance between the centers of the at least two color peaks.

EMBODIMENT 13

The method according to the preceding embodiment, wherein the at least one item of color resolution information comprises the distance between the at least two color peaks.

EMBODIMENT 14

The method according to any one of the two preceding embodiments, wherein the method comprises comparing the distance between the centers of the at least two color peaks with at least one threshold value for determining the suitability of a mobile device for the purpose of performing the analytical measurement based on the color formation reaction.

EMBODIMENT 15

The method according to any one of the three preceding embodiments, wherein the method comprises determining at least one calibration factor for color rescaling based on a ratio of the distance between the centers of the at least two color peaks and an expected distance between the centers of the at least two color peaks.

EMBODIMENT 16

The method according to any one of the preceding embodiments, wherein the method comprises using at least one processor and software instructions for performing at least method step d).

EMBODIMENT 17

The method according to the preceding embodiment, wherein the processor is part of the mobile device.

EMBODIMENT 18

The method according to any one of the preceding embodiments, wherein the mobile device is selected from the group consisting of: a mobile communications device, specifically a smart phone; a portable computer, specifically a notebook; a tablet computer.

EMBODIMENT 19

The method according to any one of the preceding embodiments, wherein method step c) comprises providing visual guidance for a user for positioning the mobile device relative to the object.

EMBODIMENT 20

A method for performing an analytical measurement based on a color formation reaction by using a mobile device having at least one camera, comprising:
  i) evaluating the suitability of the mobile device by using the method according to any one of the preceding embodiments;
  ii) if the at least one item of color resolution information indicates the mobile device being unsuited for performing the analytical measurement, aborting the method for performing the analytical measurement;
  iii) if the at least one item of color resolution information indicates the mobile device being suited for performing the analytical measurement, performing the analytical measurement, comprising the following steps:
   a. applying at least one sample to at least one test element having at least one test chemical capable of a color formation reaction;
   b. taking at least one image of at least part of the test element by using the camera;
   c. evaluating the image and deriving at least one analytical information thereof.

EMBODIMENT 21

The method according to the preceding embodiment, wherein step i) is performed at least once before step iii) is performed.

EMBODIMENT 22

The method according to any one of the two preceding embodiments, wherein step ii) comprises informing a user of the mobile device of the unsuitability of the mobile device for performing the analytical measurement.

EMBODIMENT 23

The method according to any one of the three preceding embodiments, wherein step ii) comprises blocking future attempts to perform the analytical measurement by using the mobile device.

EMBODIMENT 24

A computer program including computer-executable instructions for performing the method according to any one of the preceding embodiments, specifically method step d) and optionally one or more of the method steps c), e) and f), when the program is executed on a computer or computer network, specifically a processor of a mobile device having at least one camera.

EMBODIMENT 25

A mobile device for performing an analytical measurement based on a color formation reaction, the mobile device having at least one camera, the mobile device being configured for performing a self-suitability evaluation by using the following steps:
  I. taking at least one image of at least part of at least one reference color field on at least one object by using the camera; and
  II. deriving at least one item of color resolution information by using the image.

EMBODIMENT 26

The mobile device according to the preceding embodiment, the mobile device further being configured for performing at least one analytical measurement based on a color formation reaction by using the following steps:
  III. evaluating the suitability of the mobile device based on the at least one item of color resolution information;
  IV. if the at least one item of color resolution information indicates the mobile device being unsuited for performing the analytical measurement, aborting the analytical measurement;
  V. if the at least one item of color resolution information indicates the mobile device being suited for performing the analytical measurement, performing the analytical measurement, comprising the following steps:
a. taking at least one image of at least part of a test element by using the camera, the test element having at least one test chemical capable of a color formation reaction, specifically at least one test field, the test element having applied thereto at least one sample;
b. taking at least one image of at least part of the test element by using the camera;
c. evaluating the image and deriving at least one analytical information thereof.

EMBODIMENT 27

The mobile device according to any one of the two preceding embodiments, wherein the mobile device is configured for performing the method according to any one of the preceding method embodiments.

EMBODIMENT 28

A kit for performing an analytical measurement, the kit comprising:
at least one mobile device according to any one of the preceding embodiments referring to a mobile device;
at least one object having at least one reference color field; and
at least one test element having at least one test chemical capable of a color formation reaction.

EMBODIMENT 29

The kit according to the preceding embodiment, wherein the object is selected from the group consisting of: a container for receiving the at least one test element; a reference color shim; the test element, with the test element having the at least one reference color field applied thereon.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:
FIG. 2 shows a flow chart of a method for evaluating the suitability of a mobile device;
FIG. 3 shows a flow chart of a method for performing an analytical measurement.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
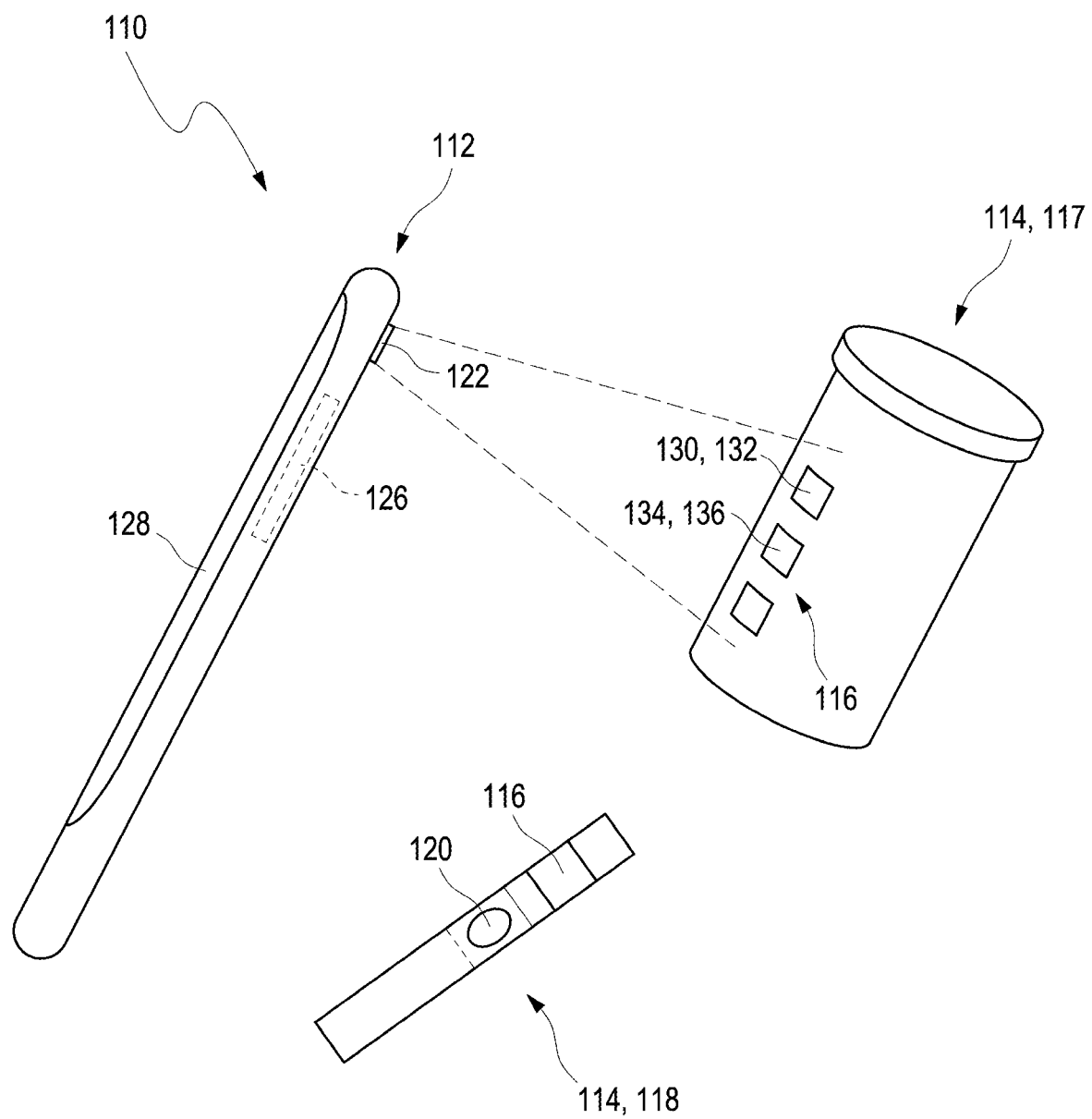
FIG. 1 shows a perspective view of an embodiment of a kit and a mobile device for performing an analytical measurement.

In FIG. 1, a kit 110 for performing an analytical measurement is shown in a perspective view. The kit 110 comprises at least one mobile device 112, at least one object 114 having at least one reference color field 116, and at least one test element 118 having at least one test chemical 120 capable of a color formation reaction. The object 114 having the at least one reference color field 116, as shown in FIG. 1, may be a test element 118, specifically a test strip, or a test element container 117, specifically a test strip container. The reference object 114 may be or may comprise the at least one reference color field 116, preferably a plurality of reference color fields 116, each having a predefined color. Thus, in FIG. 1, two different possibilities for arranging the at least one reference color field 116 are shown, which may be realized independently, i.e., the possibility of having the at least one reference color field 116 comprised by the test element container 117 and/or having the reference color field 116 comprised by the test element 118.

The mobile device 112 has at least one camera 122 and may comprise a display 128 and a processor 126. Further, the mobile device 112 is configured for performing a self-suitability evaluation. The self-suitability evaluation comprises taking at least one image of the at least one reference color field 116, or a part thereof, by using the camera 122. As an example, an image 123 of the at least one reference color field 116 is shown schematically in FIG. 4. The self-suitability evaluation further comprises deriving at least one item of color resolution information by using the image 123. The item of color resolution information may specifically comprise one or more numerical values, quantifying a capability of the camera 122 for resolving two or more colors. Thus, the item of color resolution information may, for example, be or may comprise a minimum distance between two color signals which is required for distinguishing two colors.

Figure 4:
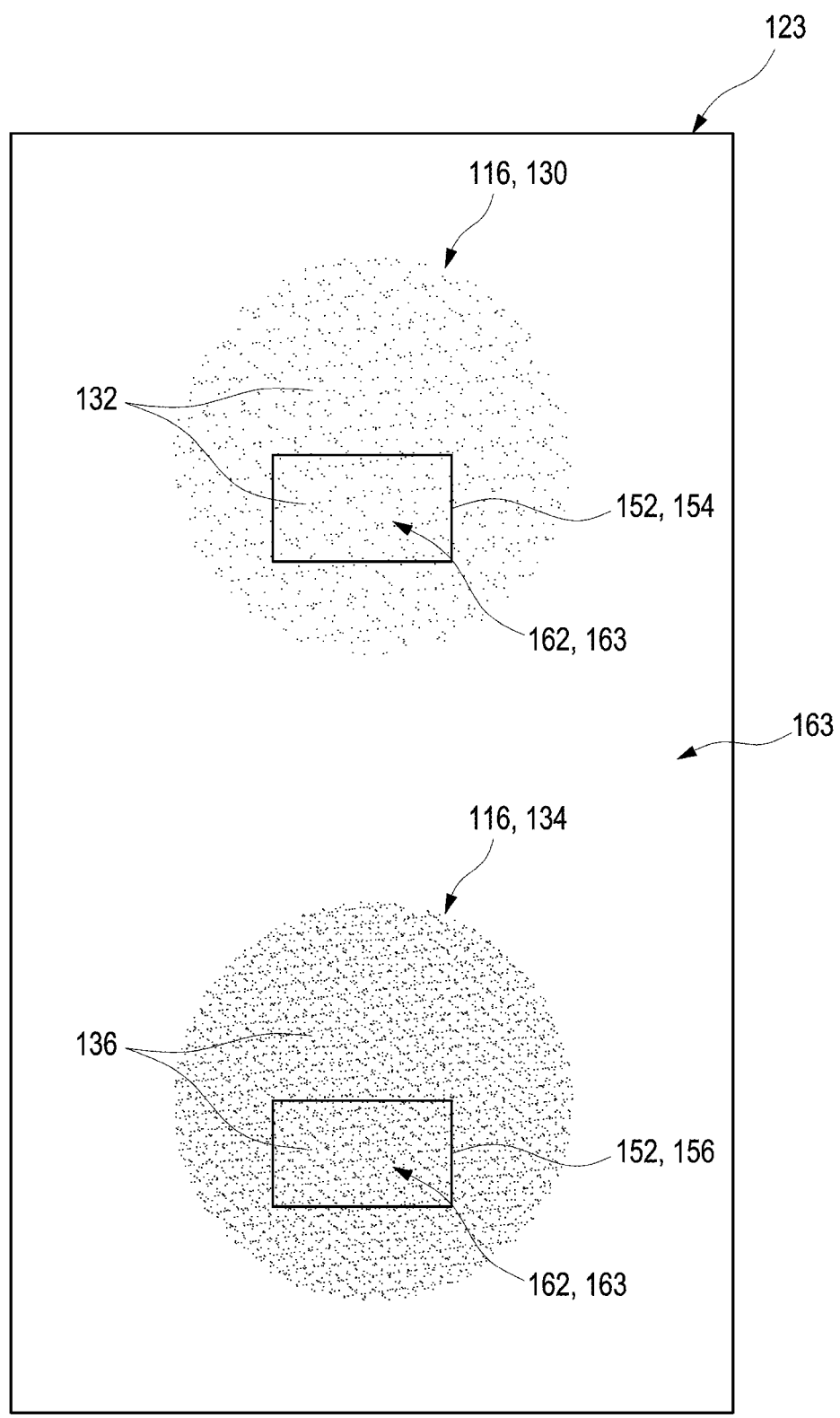
FIG. 4 shows an embodiment of an image taken by a mobile device.

In order to determine the item of color resolution information, an evaluation of one or more reference color fields 116 may be performed. In the following, as an example, an evaluation of at least two reference color fields 116 is shown. As shown in FIGS. 1 and 4, the object 114 may have a plurality of reference color fields 116. Preferably the object 114 may have a first reference color field 130 having a first color 132, and a second reference color field 134 having a second color 136. As an example, the object 114 may also have more than two reference color fields 116, as can be seen in FIG. 1. The reference color fields 116 may each vary in size and shape. For example, the reference color fields 116 shown in FIG. 1 each may have a rectangular shape, wherein the reference color fields 116 shown in FIG. 4 may have a round shape. Specifically, the reference color fields 116 may each have a different shape. Thus, it may be possible for the first reference color field 130 and the second reference color field 134 to differ in shape.

In FIG. 2, a flow chart 138 of an embodiment of a method 140 for evaluating the suitability of a mobile device is shown, e.g., based on the setup of FIGS. 1 and 4. The method 140 comprises step a) (method step 142) providing the at least one mobile device 112 having at least one camera 122 as, for example, shown in FIG. 1. The method 140 further comprises step b) (method step 144) providing at least one object 114 having at least one reference color field 116, such as shown in FIG. 1. Further, the method 140 comprises step c) (method step 146) taking at least one image 123 of at least part of the reference color field 116 by using the camera 122.

Figure 10:
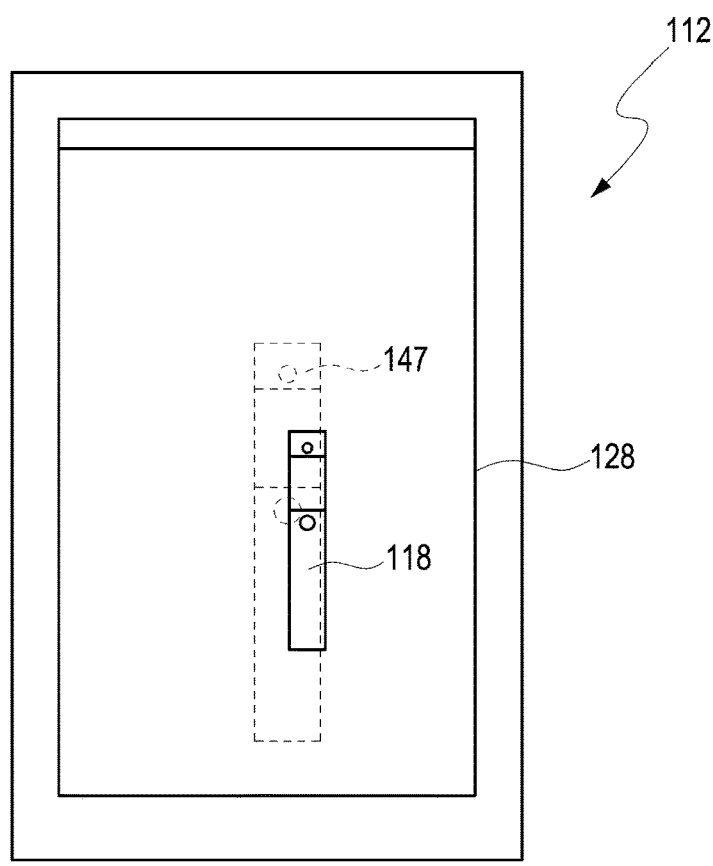
FIG. 10 shows an embodiment of a mobile device taking an image.

An embodiment of a mobile device 112 taking an image 123 (step c) above, the mobile device 112 comprising a camera 122, is illustrated in FIG. 10. Additionally, when taking the image 123 of at least part of the reference color field 116 using the camera, guidance for positioning the mobile device 112 and/or the camera 122 relative to the object 114, may be provided. The guidance may be a visual guidance and may be or may comprise an outline 147, for example a rectangular outline or a shape of the object 114 or the test element 118, superimposed on the display 128 of the mobile device 112. As shown in FIG. 10, the guidance may comprise the outline 147 of the test element 118, superimposed on the display 128 of the mobile device 112, providing visual guidance for positioning the camera 122 and/or the mobile device 112 relative to the test element 118. The method 140 may further comprise step d) (method step 148) deriving at least one item of color resolution information by using the image 123.

Method step 148 (step d) may comprise substeps, such as three substeps. A first substep d1) (method step 150) may comprise determining at least one region of interest 152 within the image 123. Specifically, method step 150 may comprise determining at least one region of interest 152 within the image 123 of at least part of the reference color field 116. An example for the region of interest 152 is illustrated in FIG. 4. Thus, for example, a first region of interest 154 may be detected in a first reference color field 130 having a first color 132, and a second region of interest 156 may be detected in a second reference color field 134 having a second color 136.

A second substep d2) (method step 158) may comprise determining at least one color coordinate 160 of pixels 162 of the image 123 within the region of interest 152. Specifically, the image 123 taken by the camera 122 may comprise a plurality of image pixels 163. Thus, the region of interest 152 determined from within the image 123 may comprise part of the image pixels 163. Specifically, the pixels 162 comprised by the region of interest 152 may be smaller in number than the image pixels 162 comprised by the image 123. Every image pixel 163 including the pixels 162 may present a color that can be described in a color coordinate system comprising the at least one color coordinate 160. For example, the at least one color coordinate 160 may be known to undergo a most significant change during the color formation reaction of the test chemical 120. Thus, specifically the at least one color coordinate 160 of the pixels 162 within the region of interest 152 may therefore be determined. More specifically, for each pixel 162 a value signifying the at least one color coordinate 160 of the pixel 162 may be determined.

A third substep d3) (method step 164) may comprise performing at least one statistical analysis 165 on a distribution of the color coordinates 160 of the pixels 162. Specifically, the statistical analysis 165 may be performed on the values signifying the color coordinates 160 of the pixels 162 within the region of interest 152. The statistical analysis 165 of the distribution over the color coordinates 160 of the pixels 162 specifically may contain a histogram analysis 166 of the distribution over the color coordinates 160 of the pixels 162.

Figure 6:
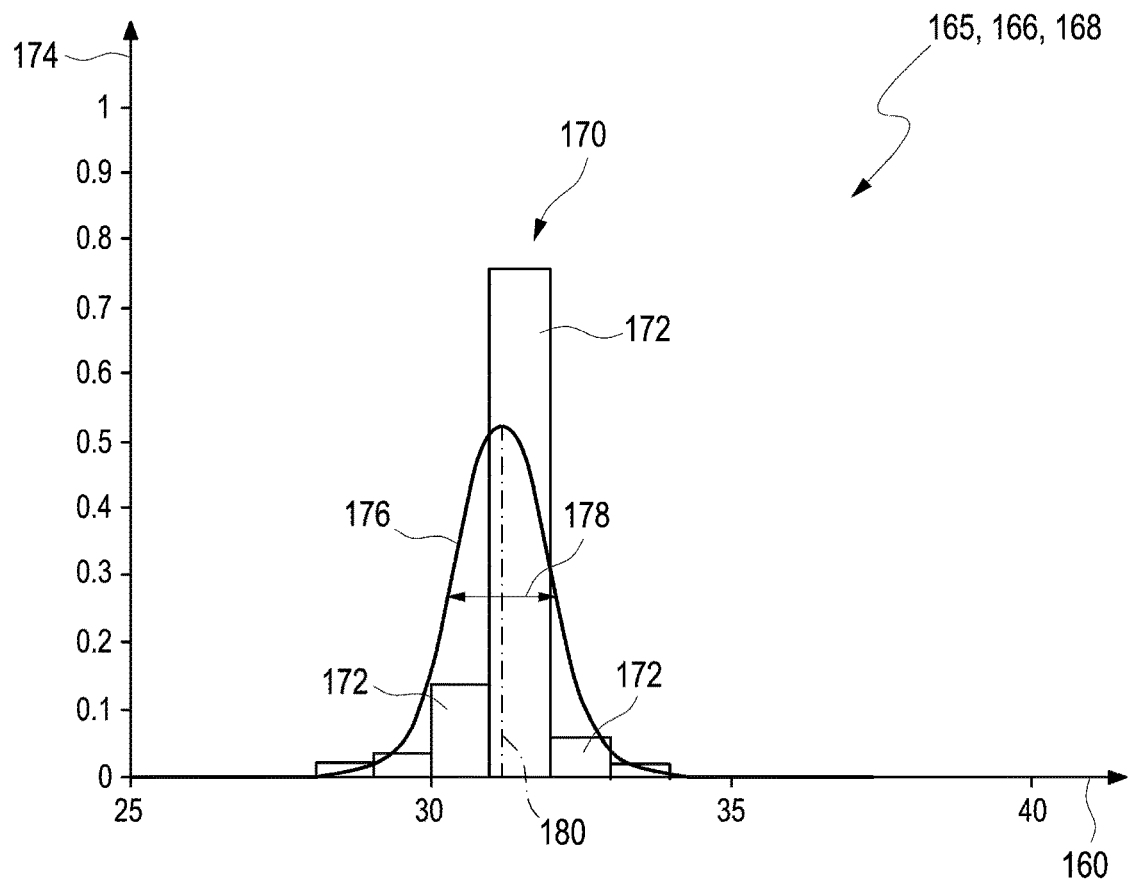

FIG. 6 shows a graph 168 of an embodiment of the histogram analysis 166 of the distribution over the color coordinates 160 of the pixels 162. The histogram analysis 166 may comprise a histogram 170 over the color coordinate 160. The histogram 170 may be established, for example, by quantization of the values signifying the color coordinates 160 of the pixels 162 into distinct sections on the axis of the color coordinate 160. The quantified values 172 are plotted in FIG. 6 with respect to a quantifying axis 174. Subsequently, a curve 176 may be fitted to the histogram 170 using at least one fitting parameter. The third substep d3) (method step 164) may further comprise deriving the at least one item of color resolution information by using at least one result of the statistical analysis 165. Specifically, the at least one item of color resolution information may comprise a width 178, such as a full width at half maximum. The width 178 may be derived from the at least one fitting parameter. The width 178 directly may indicate the color resolution of the camera 122 and/or the mobile device 112 comprising the camera 122. Further, a maximum or peak of the fitted curve 176 may indicate a center 180 of the distribution over the at least one color coordinate 160 of the pixels 162.

Figure 5:
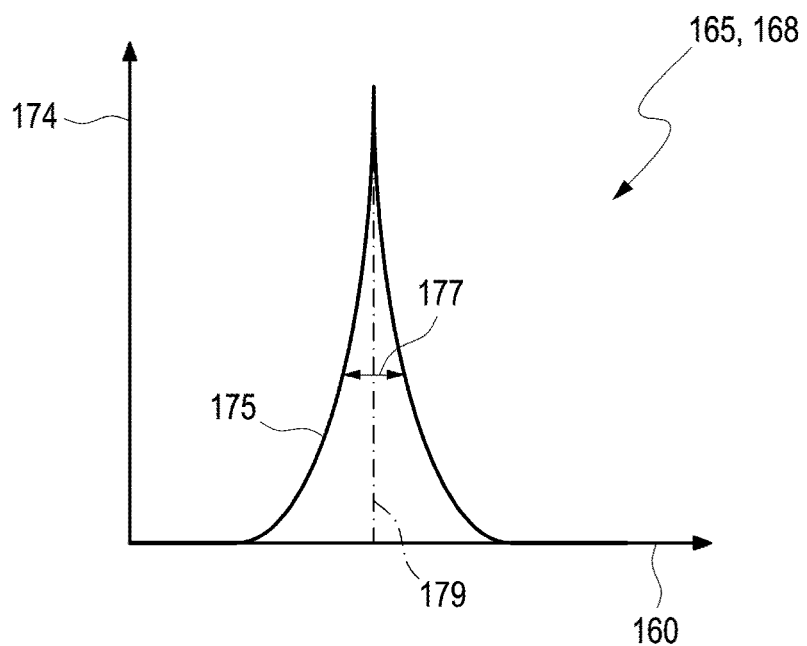
FIGS. 5 and 6 show graphs of embodiments of statistical analysis of an ideal (FIG. 5) and a real (FIG. 6) distribution of color coordinates of pixels within a single region of interest.

FIG. 5 shows a graph 168 of an idealized embodiment of the statistical analysis 165. Specifically, an ideal distribution over the color coordinates 160 of the pixels 162 may be represented by the ideal curve 175 shown in FIG. 5. The color of the reference field 116 may generally be known and therefore can be used to create such an ideal distribution, wherein the width shown in FIG. 5 may equal a maximum width 177 indicating a minimum resolution of the camera 122 and/or the mobile device 112 for the purpose of performing the analytical measurement. Thus, the ideal center 179 may equal the color of the color reference field 116.

The method 140 for evaluating the suitability of a mobile device 112 may further comprise step e) (method step 181) comparing the at least one item of color resolution information with at least one threshold value 182, thereby determining at least one item of suitability information 183 on the suitability of a mobile device 112 for the purpose of performing the analytical measurement based on the color formation reaction. The at least one threshold value 182 may be derived from a desired accuracy and/or from a desired precision of the analytical measurement, e.g., of the glucose concentration determination. For example, the threshold value 182 may be or may comprise the maximum width 177, indicating the minimum resolution of the camera, shown in FIG. 5.

In the histogram analysis 166 shown in FIG. 6, the center 180 of the distribution over the color coordinate 160 of the pixels 162 within the region of interest 152 may correspond to a reference color of the reference color field 116, as shown in FIG. 4. Thus, additionally or alternatively, the threshold value 182 may be or may comprise a maximum discrepancy between the known color of the reference color field 116 and the determined color of the reference color field 116. The discrepancy between the known color and the determined color may be measured in a distance between the center 180 and the ideal center 179. The at least one item of suitability information 183 may thereby be determined by comparing the item of color resolution information, specifically the width and/or the distance between the center 180 and the ideal center 179, with the threshold value, specifically the maximum width 177 and/or the maximum discrepancy or distance between the center 180 and the ideal center 179.

Figure 7:
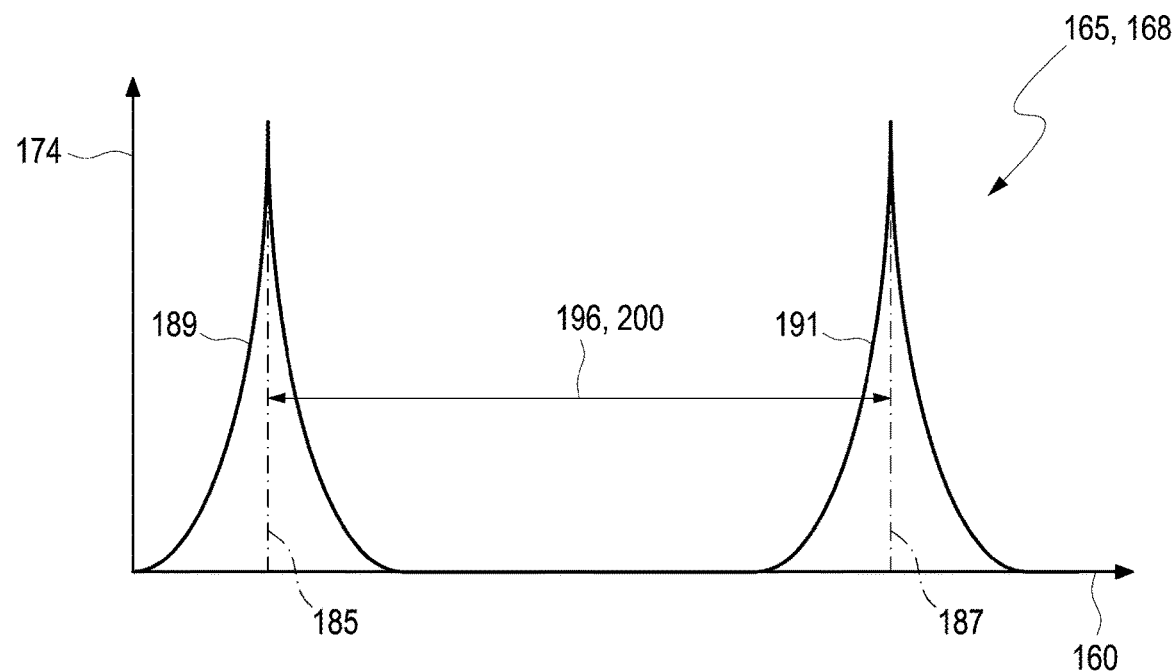
FIGS. 7, 8 and 9 show graphs of embodiments of statistical analysis of an ideal (FIGS. 7 and 9) and a real (FIGS. 8 and 9) distribution of color coordinates of pixels within two separate regions of interest.
Figure 8:
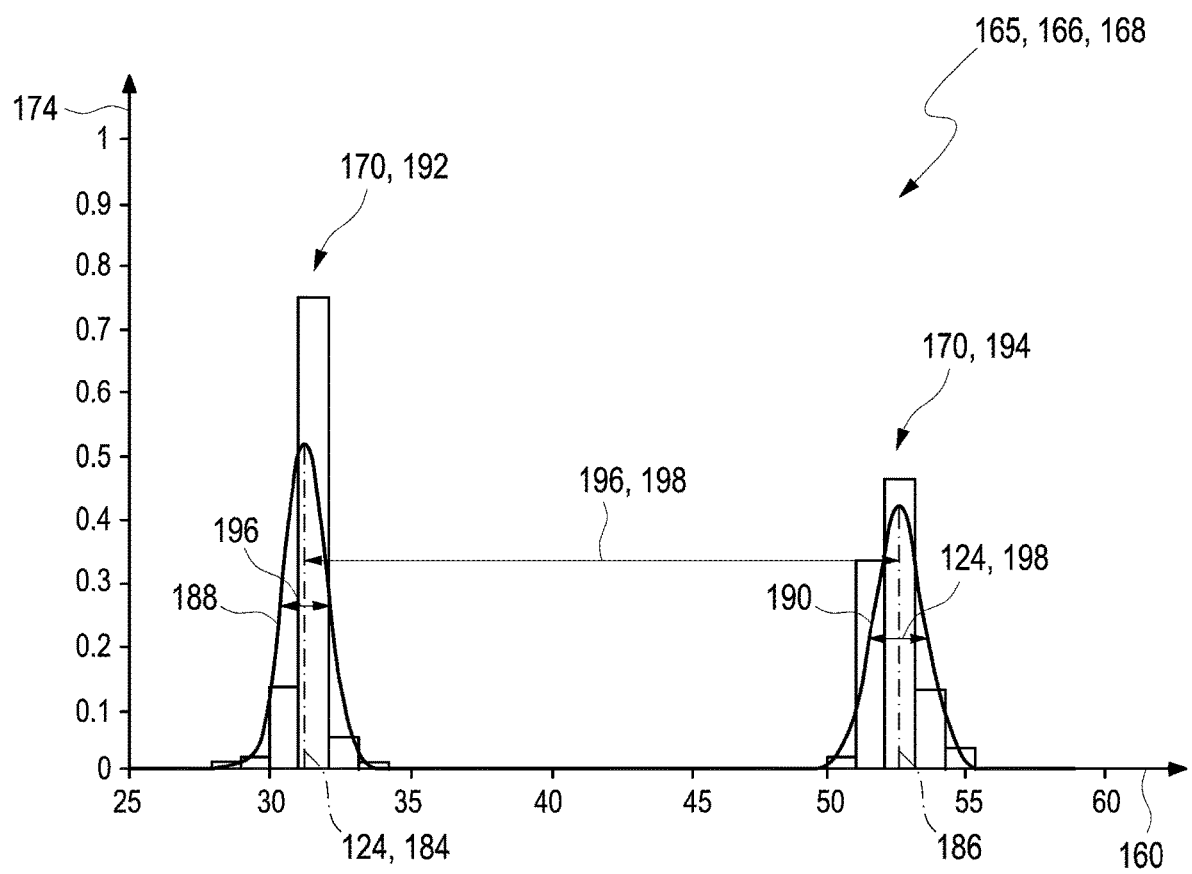

As shown in FIG. 1 and FIG. 4, two different reference color fields 116 may exist within the image 123 taken by the camera 122. Thus, two different centers 180 may be derived by the statistical analysis 165. A first center 184 may be derived from the statistical analysis 165 of the distribution over the color coordinate 160 of the pixels 162 within the first region of interest 154, and a second center 186 may be derived from the statistical analysis 165 the distribution over the color coordinate 160 of the pixels 162 within the second region of interest 156, as shown in FIG. 8. FIG. 7 shows the graph 168 of the statistical analysis 165 of an idealized first curve 189 indicating an idealized distribution over the color coordinate 160 of the pixels 162 within the first region of interest 154 detected in the first color field 130 having the first color 132. The graph 168 of the statistical analysis 165 displayed in FIG. 7, further shows an idealized second curve 190 indicating an ideal distribution over the color coordinate 160 of the pixels 162 within the second region of interest 156 detected in the second color field 134 having the second color 136. FIG. 7 further shows an idealized first center 185 representing the first color 132, and an idealized second center 187 representing the second color 136.

Figure 9:
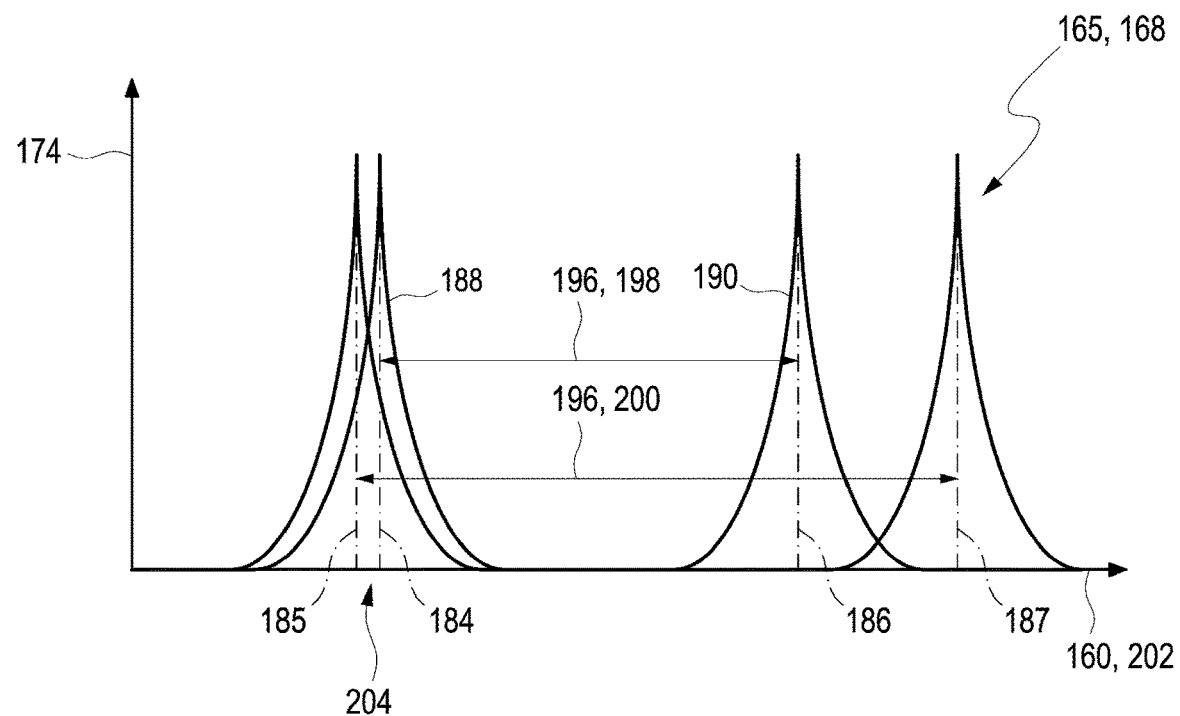

FIG. 8 shows the graph 168 of the statistical analysis 165, specifically the histogram analysis 166, comprising two histograms 170. A first histogram 192 may be established, for example, by quantization of the values signifying the color coordinates 160 of the pixels 162 of the first region of interest 154, and a second histogram 194 may be established, for example, by quantization of the values signifying the color coordinates 160 of the pixels 162 of the second region of interest 156. Subsequently, the first curve 188 may be fitted to the first histogram 190 and the second curve 190 may be fitted to the second histogram 194. As shown in FIG. 7, the first center 184 may be derived from the first curve 188 and the second center 186 may be derived from the second curve 190. Further, a first width 196 and a second width 198 may be derived from the first curve 188 and the second curve 190. A distance 196 between the first center 184 and the second center 186 may be determined, leading to a determined distance 198. As outlined above, the colors of the reference color fields 116 are generally known. Therefore, consequently, the distance 196 between the ideal first center 185 indicating the first color 132 and the ideal second center 187 indicating the second color 136 is generally known, leading to an expected distance 200. Specifically, as shown in FIG. 9, a difference between the determined distance 198 and the expected distance 200 may exist.

The method 140 for evaluating the suitability of a mobile device 112 may further comprise step f) (method step 201) adjusting at least one color scale 202 of the mobile device 112 for the analytical measurement. Specifically, the difference between the determined distance 198 and the expected distance 200 may be used for adjusting the at least one color scale 202 of the mobile device for the analytical measurement. Specifically, a stretching of a scale of the color coordinate 160 and/or an offset 204 may be determined in order to rescale the at least one color scale 202 of the mobile device 112 for the analytical measurement. More specifically, a calibration factor and/or the offset 204 may be determined for rescaling the color scale 202 of the mobile device 112.

The mobile device 112 may further be configured for performing at least one analytical measurement based on a color formation reaction. A flow chart 206 of an embodiment of a method for performing an analytical measurement based on a color formation reaction is shown in FIG. 3. The method 206 for performing an analytical measurement may comprise a first step i) (method step 208) evaluating the suitability of the mobile device 112 by using the method 140 for evaluating the suitability of a mobile device 112. Specifically, the suitability of the mobile device 112 may be evaluated by using the method 140 as described above.

Further, the method 206 may comprise a branching point 210. The branching point 210 may indicate a condition query, such as deciding between a first branch 212 and a second branch 214. For example, the condition query may make use of the item of suitability information. The item of suitability information 183 may comprise Boolean information on the mobile device 112, such as "suited" ("y") or "not suited" ("n"). The first branch 212 indicates the mobile device 112 being unsuited for performing the analytical measurement, thus the first branch may lead to a second step ii) (method step 216) if the at least one item of suitability information 183 indicates the mobile device 112 being unsuited for performing the analytical measurement, aborting the method 206 for performing the analytical measurement. Specifically, the blood glucose measurement may not be performed if the item of suitability information 183 indicates the mobile device 112 being unsuited for performing the blood glucose measurement. More specifically, the blood glucose measurement may not be performed if the desired accuracy and/or the desired precision for determining the blood glucose concentration are not met by the mobile device 112 and/or the camera 122.

The second branch 114 indicates the mobile device 112 being suited for performing the analytical measurement. Thus the second branch may lead to performing a third step iii) (method step 218) if the at least one item of suitability information 183 indicates the mobile device 112 being suited for performing the analytical measurement, performing the analytical measurement. Specifically, the blood glucose measurement may be performed if the item of suitability information 183 indicates the mobile device 112 being suited for performing the blood glucose measurement. More specifically, the blood glucose measurement may only be performed if the desired accuracy and/or the desired precision for determining the blood glucose concentration are met by the camera 122 and/or the mobile device 112. For example, once the suitability of the mobile device 112 is determined, an arbitrary number of analytical measurements may be performed using the mobile device 112. Alternatively, however, the evaluation of the suitability of the mobile device 112, e.g., method 140, may be repeated, for example after predetermined or determinable intervals or in case any changes are made to the mobile device 112. Thus, step i) (method step 208) may be performed at least once before step iii) (method step 218) is performed at least once, or method step 208 may be performed at least once before method step 218 may be performed repeatedly. However, performing the analytical measurement by using the mobile device 112 according to method step 218 may comprise a plurality of substeps.

The method step 218 may comprise a first partial step a) (method step 220) comprising applying at least one sample to at least one test element 118 having at least one test chemical 120 capable of a color formation reaction. Specifically, at least one sample of bodily fluid, for example blood, may be applied to at least one test element 118. The test element 118, as shown in FIG. 1, may comprise a test chemical 120 capable of the color formation reaction. In particular, the test chemical 120 may be capable of the color formation reaction correlating to an analyte concentration in the bodily fluid. For example, the test chemical 120 may be capable of the color formation reaction correlating to a glucose concentration within the blood applied to the test element 118.

The method step 218 may further comprise a second partial step b) (method step 222) comprising taking at least one image 123 of at least part of the test element 118 by using the camera 122. Specifically, when taking the at least one image 123 of at least part of the test element 118, the outline 147, superimposed on the display 128 of the mobile device 112, as shown in FIG. 10, may provide visual guidance for positioning the test element 118 relative to the camera 122 of the mobile device 112. Thus, guidance may be provided both in method step 164 within the method 140 and in method step 222 within method 206. Accordingly, FIG. 10, showing a mobile device 112 taking an image may illustrate both method step 164 of method 140 and method step 222 of method 206.

Further, the method step 218 may comprise a third partial step c) (method step 224) comprising evaluating the image 123 and deriving at least one analytical information thereof. Specifically, the at least one analytical information may be or may comprise a concentration of the analyte within the sample, such as the blood glucose concentration within the blood, applied to the test element 120 comprising the test chemical 120 capable of the color formation reaction. The evaluation of the image 123 may comprise transforming the determined color coordinate of the test chemical 120 into a concentration of the analyte within the sample, by using a predetermined or determinable correlation between the color coordinate and the concentration. The correlation, for example, may be or may comprise a transformation function, a transformation table or a lookup table, determined empirically. The correlation may further, as an example, be stored in a storage device comprised by the mobile device 112 illustrated in FIG. 1. Specifically, the correlation may be stored in the storage device by a software, more specifically by an app. Further, the software and/or the app may be or be comprised by a computer program, including computer-executable instructions for performing both the method 140 and the method 206, as illustrated in FIG. 2 and FIG. 3. The program may be executed on a computer or computer network, specifically, the program may be executed on the processor 126 of the mobile device 112 comprising the camera 122.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 kit for performing an analytical measurement
112 mobile device
114 Object
116 reference color field
117 test element container
118 test element
120 test chemical
122 Camera
123 Image
126 Processor
128 Display
130 first reference color field
132 first color
134 second reference color field
136 second color
138 flow chart
140 method for evaluating the suitability of a mobile device
142 step a): providing at least one mobile device having at least one camera
144 step b): providing at least one object having at least one reference color field
146 step c): taking at least one image of at least part of the reference color field by using the camera
147 Outline
148 step d): deriving at least one item of color resolution information by using the image
150 substep d1): determining at least one region of interest within the image
152 region of interest
154 first region of interest
156 second region of interest
158 substep d2): determining at least one color coordinate of pixels of the image within the region of interest
160 color coordinate
162 Pixel
163 image pixel
164 substep d3): performing at least one statistical analysis on a distribution of the color coordinates of the pixels
165 statistical analysis
166 histogram analysis
168 graph
170 histogram
172 quantified values
174 quantifying axis
175 ideal curve
176 curve
177 minimum width
178 width
179 ideal center
180 center
181 step e): comparing the at least one item of color resolution information with at least one threshold value
182 threshold value
183 item of suitability information
184 first center
185 ideal first center
186 second center
187 ideal second center
188 first curve
189 ideal first curve
190 second curve
191 ideal second curve
192 first histogram
194 second histogram
196 Distance
198 determined distance
200 expected distance
201 step f): adjusting at least one color scale of the mobile device for the analytical measurement
202 color scale
204 Offset
206 method of performing an analytical measurement
208 step i): evaluating the suitability of the mobile device
210 branching point
212 first branch: mobile device unsuited
214 second branch: mobile device suited
216 step ii): aborting the method
218 step iii): performing the analytical measurement
220 partial step a): applying at least one sample to at least one test element
222 partial step b): taking an image of the test element by using the camera
224 partial step c): evaluating the image and deriving the analytical information thereof

What is claimed is:

1. A method for evaluating the suitability of a mobile device having a camera for performing an analytical measurement based on a color formation reaction, the method comprising:
   a) providing the mobile device;
   b) providing an object having a reference color field;
   c) taking an image of at least part of the reference color field using the camera;
   d) determining a region of interest (ROI) within the image;
   e) determining color coordinates of pixels of the image within the ROI;
   f) performing a histogram analysis on a distribution of the color coordinates of the pixels and deriving a width of a color peak within the distribution from the histogram analysis;
   g) comparing the width with a threshold value to thereby determine suitability of the mobile device for performing the analytical measurement based on the color formation reaction;
   h) when the mobile device is determined unsuitable for performing the analytical measurement, performing at least one of: informing a user of the mobile device of the unsuitability of the mobile device for performing the analytical measurement, and blocking future attempts to perform the analytical measurement by using the mobile device; and
   i) when the mobile device is determined suitable for performing the analytical measurement, instructing the user to perform the analytical measurement.

2. The method according to claim 1, further comprising adjusting a color scale of the mobile device for the analytical measurement.

3. The method according to claim 1, wherein the histogram analysis comprises determining at least one color coordinate of at least one center of at least one color peak within the distribution of color coordinates.

4. The method according to claim 1, wherein the object has at least two reference color fields having different colors, the method further comprising:
   determining at least two color peaks corresponding to the at least two different colors;
   determining a distance between the centers of the at least two color peaks; and
   determining a calibration factor for color rescaling based on a ratio of the distance between the centers of the at least two color peaks and an expected distance between the centers of the at least two color peaks.

5. The method according to claim 1, wherein step c) comprises providing visual guidance for a user to position the mobile device relative to the object.

6. A method for performing an analytical measurement based on a color formation reaction by using a mobile device having a camera, the method comprising:
   evaluating the suitability of the mobile device according to claim 1; and
   when the mobile device is determined unsuitable for performing the analytical measurement, aborting the method.

7. A non-transitory computer-readable medium having stored thereon computer-executable instructions for performing the method according to claim 1.

8. A mobile device for performing an analytical measurement based on a color formation reaction, the mobile device having a camera and being configured for performing a self-suitability evaluation by using the following steps:
   taking an image of at least part of a reference color field on an object by using the camera;
   deriving color resolution information by using the image, wherein the color resolution information includes one or more numerical values that quantify the capability of resolving two or more colors;
   evaluating the suitability of the mobile device based on the color resolution information;
   when the color resolution information indicates that the mobile device is unsuited for performing the analytical measurement, aborting the analytical measurement; and
   when the color resolution information indicates that the mobile device is suited for performing the analytical measurement, performing the analytical measurement, comprising the following steps:
      a. taking an image of at least part of a test element by using the camera, the test element having a test chemical capable of a color formation reaction and having applied thereto at least one sample;
      b. evaluating the image and deriving analytical information therefrom.

9. A kit for performing an analytical measurement, the kit comprising:
   a mobile device according to claim 8;
   an object having a reference color field; and
   a test element having a test chemical capable of a color formation reaction.

* * * * *